(12) United States Patent
Rhodes et al.

(10) Patent No.: US 10,244,610 B2
(45) Date of Patent: Mar. 26, 2019

(54) METHOD AND APPARATUS FOR AN INTELLIGENT LIGHTING SYSTEM

(71) Applicant: Illum Technology, LLC, Mesa, AZ (US)

(72) Inventors: James V. Rhodes, Mesa, AZ (US); James M. Shaker, Mesa, AZ (US)

(73) Assignee: Illum Horticulture LLC, Mesa, AZ (US)

(*) Notice: Subject to any disclaimer, the term of this patent is extended or adjusted under 35 U.S.C. 154(b) by 0 days.

(21) Appl. No.: 15/905,617

(22) Filed: Feb. 26, 2018

(65) Prior Publication Data

US 2018/0249562 A1    Aug. 30, 2018

Related U.S. Application Data

(60) Provisional application No. 62/464,045, filed on Feb. 27, 2017.

(51) Int. Cl.
*H05B 37/02* (2006.01)
*H05B 33/08* (2006.01)

(52) U.S. Cl.
CPC ..... *H05B 37/0272* (2013.01); *H05B 33/0854* (2013.01); *H05B 37/0218* (2013.01); *H05B 37/0254* (2013.01)

(58) Field of Classification Search
CPC ............ H05B 37/0272; H05B 37/0227; H05B 37/0218; H05B 33/0845; H05B 37/0245; H05B 37/0281; H05B 33/0842; H05B 37/0254; H05B 33/0854; H05B 33/0857; H05B 33/0872; H05B 33/0863; H05B 33/0869; H05B 37/0263; H05B 37/02; H05B 33/0815; H05B 37/029; H05B 33/0848; H05B 33/0803; H05B 33/089; H05B 41/36; H04B 10/116; H04B 10/1149; H04B 1/00; Y02B 20/46; Y02B 20/48; Y02B 20/44; Y02B 20/72; Y02B 70/325; Y02B 70/3283; Y02B 90/2653; Y02B 90/2684; H04L 12/2803; H04L 12/282; H04L 2012/2841
See application file for complete search history.

(56) References Cited

U.S. PATENT DOCUMENTS

| | | | |
|---|---|---|---|
| 6,990,394 B2 * | 1/2006 | Pasternak | H04L 12/2803 455/3.01 |
| 8,445,826 B2 * | 5/2013 | Verfuerth | H05B 37/0218 250/205 |
| 9,832,845 B2 * | 11/2017 | Cho | H05B 37/0272 |
| 2011/0050132 A1 * | 3/2011 | Hooijer | H05B 37/02 315/297 |
| 2015/0195883 A1 * | 7/2015 | Harris | H05B 33/0845 315/155 |

(Continued)

*Primary Examiner* — Vibol Tan
(74) *Attorney, Agent, or Firm* — Michael T. Wallace

(57) ABSTRACT

A method and apparatus for a lighting network is provided whereby both legacy and next generation lighting may be controlled by a harmonized controller. Wireless controllers are deployed within the lighting network to control the operation of the harmonized controller. Wireless interconnectivity allows each of the wireless controllers to independently command the harmonized controller and allows each wireless controller to correctly display through visible feedback the current status of the lighting network.

18 Claims, 3 Drawing Sheets

(56) References Cited

U.S. PATENT DOCUMENTS

2016/0180617 A1* 6/2016 Windridge .............. H04L 67/22
                                                    340/5.21
2017/0094755 A1* 3/2017 Daranyi ............. H05B 37/0272
2018/0177026 A1* 6/2018 Bowser .............. H05B 37/0227

* cited by examiner

200

METHOD AND APPARATUS FOR AN INTELLIGENT LIGHTING SYSTEM

FIELD OF THE INVENTION

The present invention generally relates to lighting systems, and more particularly to lighting systems having a wireless control component.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

LEDs exhibit significantly optimized characteristics, such as source efficacy, optical control and extremely long operating life, which make them excellent choices for general lighting applications. LED efficiencies, for example, may provide light output magnitudes of up to 200 lumens per watt of power dissipation. Energy savings may, therefore, be realized when utilizing LED-based lighting systems as compared to the energy usage of, for example, incandescent, halogen, compact fluorescent and high-intensity discharge (HID) lighting systems. As per an example, an LED-based lighting fixture may utilize a small percentage (e.g., 15-20%) of the power utilized by an HID-based lighting system, but may still produce an equivalent magnitude of light.

LED technologies are gaining attraction due to their high luminous efficacy and their ability to produce narrow-band spectral distributions; therefore, their usage in home and office environments is becoming increasingly predominant. Ease, convenience and automation of use, however, of such home and office based LED lighting systems seems to be lagging behind the development of the LED lighting fixtures themselves.

Efforts continue, therefore, to develop systems and controls for home, office and business-based lighting systems.

SUMMARY

To overcome limitations in the prior art, and to overcome other limitations that will become apparent upon reading and understanding the present specification, various embodiments of the present invention disclose methods and apparatus for the command and control of lighting systems (e.g., LED-based lighting systems).

In accordance with one embodiment of the invention, a lighting network comprises one or more light fixtures, a first controller coupled to the one or more light fixtures and configured to provide wired control of one or more aspects of light generated by the one or more light fixtures in response to first and second wireless commands, a second controller wirelessly coupled to the first controller and configured to provide the first wireless command and a third controller wirelessly coupled to the first controller and configured to provide the second wireless command. The second and third controllers are configured to provide visible indications of the wired control of the one or more aspects of light.

In accordance with another embodiment of the invention, a lighting system comprises a first controller configured to provide a wired control signal and a wireless control signal, a first light fixture configured to activate a first lighting aspect in response to the wired control signal, a second light fixture configured to activate a second lighting aspect in response to the wireless control signal and a second controller wirelessly coupled to the first controller and configured to transmit first and second control signals. The first controller is configured to provide the wired control signal in response to the first control signal and further configured to provide the wireless control signal in response to the second control signal.

In accordance with another embodiment of the invention, a method of controlling a lighting system comprises configuring a first controller to provide a wired control signal and a wireless control signal, activating a first lighting aspect in response to the wired control signal, activating a second lighting aspect in response to the wireless control signal and configuring a second controller to transmit first and second control signals. The first controller provides the wired control signal in response to the first control signal and provides the wireless control signal in response to the second control signal.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to a lighting system (e.g., a light emitting diode (LED) based lighting system) that may contain one or more lighting fixtures (e.g., LED lighting fixtures) and associated driver, sensor and control systems that may be interconnected by any combination of wired (e.g., DMX or 0-10V) and/or wireless (e.g., thread-enabled mesh, Bluetooth or Wi-Fi) network. The wireless network (e.g., thread-enabled mesh network) may also utilize one or more access points to provide data (e.g., status update data) to a network (e.g., the Internet) and/or receive data (e.g., control data) from a building automation and control network (e.g., BACnet) via the one or more access points (e.g., BACnet-enabled access points). In one embodiment, such an access point (e.g., a thread-enabled border router) may exist within any one or more of the thread-enabled network components within the lighting system, or conversely may exist as a stand-alone unit.

The intelligent lighting system may generally provide the ability to integrate current lighting systems that may utilize any number of lighting fixtures, sensors and lighting system driver topologies into a centralized system using one or more harmonized controllers. For example, a typical lighting system may employ lighting fixtures that utilize either a 0-10V dimmer control or digital multiplex (DMX) control to achieve a desirable light output. Sensors (e.g., 0-10V sensors) may also be used within the system to implement any number of sensed functions (e.g., occupancy detection and ambient light detection). In such an instance, a centralized controller may be provided that harmonizes each of the dimmer control and sensor topologies to allow seamless integration into legacy lighting networks.

In other embodiments, the harmonized controller may be enabled with wireless communication capabilities, so as to enable localized and/or centralized wireless control. For example, the harmonized controller may be enabled (e.g., thread-enabled) so as to allow communication with other networks (e.g., BACnet, Internet or localized intranet) via an access point (e.g., thread-enabled border router). Accordingly, for example, any Internet and/or Wi-Fi enabled device may communicate with the harmonized controller to evoke lighting control changes and/or receive status information concerning lighting controls within the harmonized controller's zone of influence.

Figure 1:
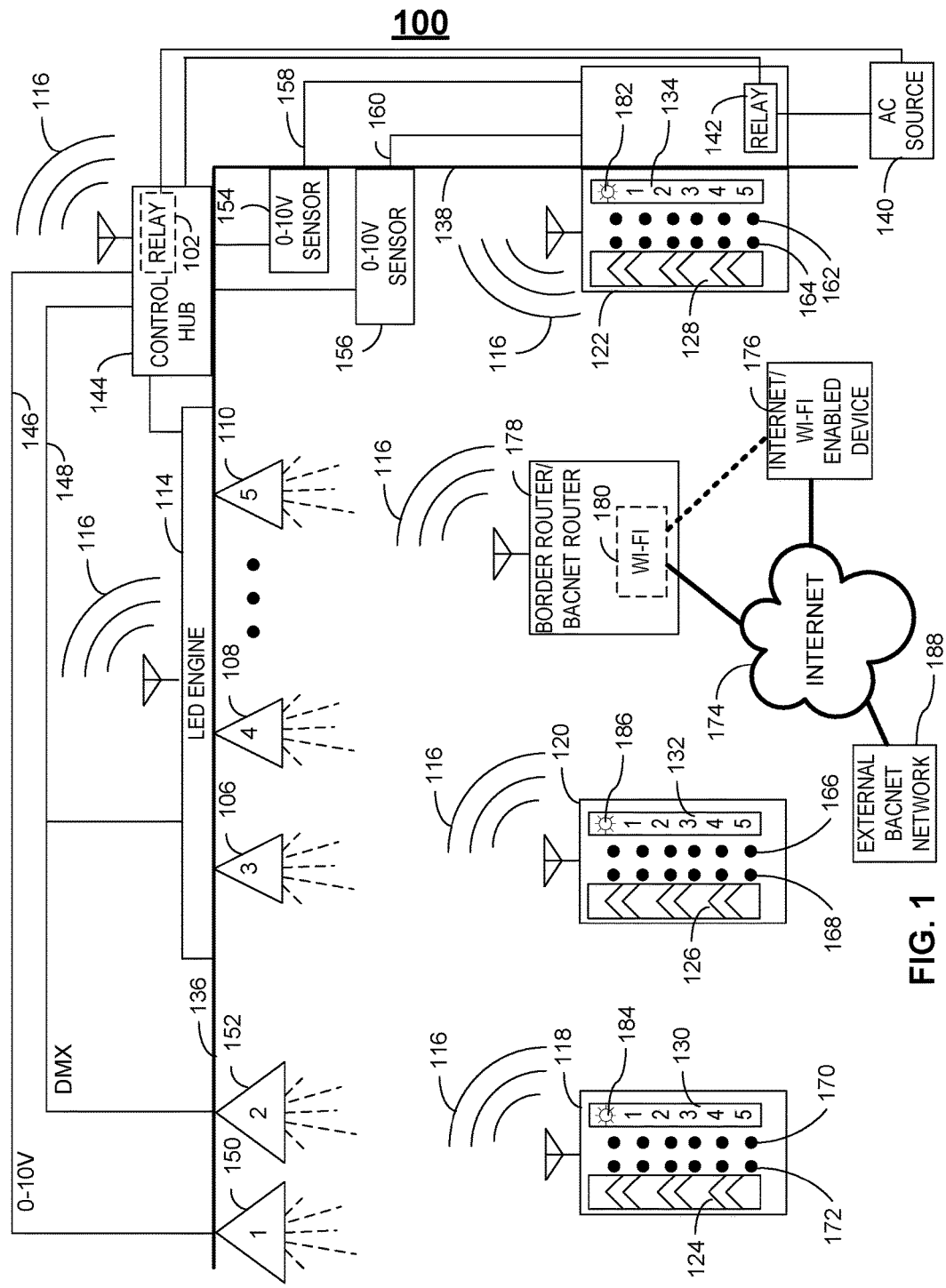
FIG. 1 illustrates an LED-based lighting network in accordance with one embodiment of the present invention.

Turning to FIG. 1, network 100 is exemplified, which may include a harmonized lighting system (e.g., legacy lighting fixtures 150, 152 and/or next generation lighting fixtures 106, 108 and 110) each implementing any number of associated control topologies (e.g., 0-10V and DMX) that may be utilized to control, for example, intensity, color temperature and/or color spectrum as well as any other attribute of light that may be emitted by the harmonized lighting system.

Network 100 may also contain any number of sensors (e.g., sensors 154 and 156), which may be used to detect, for example, occupancy, ambient light, temperature, humidity, etc. and may provide an associated status signal (e.g., a 0-10V signal) that may be indicative of the sensors' status. Any one or more of the controllers (e.g., controller 144 and/or controller 122) of network 100 may accept such sensor signal(s), detect the sensor signals' value (e.g., the magnitude of the sensor signal) and determine a sensed condition based on the detected value(s). In such an instance, for example, automated feedback of the lighting condition (e.g., ambient light intensity) may be reported to controller 144 and/or 122 and in response, the light intensity of the lighting fixtures of network 100 may be adjusted accordingly. In one example, a lower detected ambient light intensity may cause controller 144 and/or controller 122 to command an increased generated light intensity. Conversely, for example, a higher detected ambient light intensity may cause controller 144 and/or controller 122 to command a decreased generated light intensity.

As shown, network 100 may include lighting systems that may be included within any facility, including any domestic dwelling, any office or any other domestic or business-related area that may exhibit structural components such as walls 138 and ceilings 136. Each of the lighting fixtures, sensors and associated control elements of network 100 may be deployed within such structural components of the facility as a fixed or permanent asset, or conversely, may be deployed as a mobile asset that may roam throughout the facility.

For example, wall-based controller 122 and ceiling-based controller 144 may be deployed within wall 138 and ceiling 136, respectively, as fixed assets within network 100. Other fixed assets within network 100 may include, for example, next generation lighting fixtures 106, 108 and 110 as well as legacy lighting fixtures 150 and 152. Conversely, controllers (e.g., controllers 118 and 120) may be deployed within the building, but may not be deployed within any particular structural element of the building, but rather may be mobilized within the building to effect changes in network 100 by persons who may be in physical possession of controllers 118 and 120.

In one embodiment, each of the legacy and next generation lighting fixtures and associated controls of network 100 may be interconnected wirelessly (e.g., via thread-based mesh network 116). Accordingly, for example, network 100 may be implemented as a wireless personal area network (WPAN) utilizing a physical radio layer (e.g., as defined by the IEEE 802.15.4 communication standard). As such, thread-based mesh network 116 may utilize an encapsulation and header compression mechanism (e.g., 6LoWPAN) so as to allow data packets (e.g., IPv6 data packets) to be sent and received over the physical radio layer. Messaging between each device within network 100 may be implemented using a messaging protocol (e.g., user datagram protocol (UDP)), which may be preferred over an alternative protocol such as the transmission control protocol (TCP).

In addition, each device may use an application layer protocol for delivery of the UDP data packets to each device. Such application layer protocols may include the Constrained Application Protocol (CoAP), Message Queue Telemetry Transport (MQTT) or the Extensible Messaging and Presence Protocol (XMPP) within thread-based mesh network 116, which may be contrasted with the Hypertext Transport Protocol (HTTP) as may be used, for example, within network 174 (e.g., the Internet). CoAP, for example, may be more conducive for use by thread-based mesh network 116, rather than HTTP, due to the smaller packet header size required by CoAP, which may then yield smaller overall packet sizes required by the components interconnected by thread-based mesh network 116.

In operation, the components interconnected by thread-based mesh network 116 may be connected to an alternating current source (e.g., AC source 140) that may be used throughout the facility for use with other components requiring AC power for operation, such as printers, copiers, computers, heating, ventilation and air conditioning (HVAC) systems, machine equipment, etc. Furthermore, operational power derived from AC source 140 may be further controlled (e.g., via relays 142 and/or 102) so as to be compliant with, for example, the Energy Star® standard for energy efficient consumer products as promulgated jointly by the Environmental Protection Agency (EPA) and the Department of Energy (DOE).

In one embodiment, for example, wall-based controller 122 may include relay 142, which may receive the AC power signal from AC source 140. Once relay 142 is activated (e.g., closed through touch activation of element 182 on controller 122), AC power may be provided to controller 144 and subsequently provided to legacy lighting fixtures 150, 152 via power/control bus 146, 148, respectively, and to next generation lighting fixtures 106, 108 and 110. As such, the lighting fixtures of network 100 may be activated for operation without the use of thread-based mesh network 116.

In an alternate embodiment, either of mobile controllers 118 and/or 120 may be used to activate the lighting fixtures of network 100 wirelessly (e.g., through the use of thread-based mesh network 116). For example, elements 184 and 186 of mobile controllers 118 and 120, respectively, may be activated to cause a control signal to be transmitted either to relay 142 of wall-based controller 122 or to relay 102 of ceiling-based controller 144 via thread-based mesh network 116 so as to cause AC power to be provided to the lighting fixtures of network 100.

It should be noted that each of controllers 118, 120 and 122 may provide native computational components (e.g., a programmable system-on-chip (PSOC) processor) that may be reactive to touch commands (e.g., via a capacitive sensing operation performed by a processor (not shown)) on each of controllers 118, 120 and 122. Accordingly, panels 124 and 130 of controller 118, panels 126 and 132 of controller 120 and panels 128 and 134 of controller 122 may be sensitive (e.g., capacitively sensitive) to human touch and may therefore, cause control signals to be generated and propagated throughout thread-based mesh network 116 depending upon which location of the respective touch-sensitive panel was touched.

Executable applications (e.g., firmware) executed by each processor (not shown) on each of controllers 118, 120 and 122 may be customized to evoke specific functionality within network 100. In one embodiment, for example, each of panels 130, 132 and 134 may be customized (e.g., through firmware modifications) to activate network 100 (e.g., as discussed above in relation to elements 182, 184 and 186) for operation. In addition, once activated, a particular element location on each respective panel may evoke a particular reaction within network 100.

For example, a touch that may be detected by either of controllers 118, 120 and/or 122 in the vicinity of element "1" of panels 130, 132 and/or 134, respectively, may cause the lighting fixture(s) that correspond to element "1" (e.g., lighting fixture 150 of zone 1) to become activated. However, since lighting fixture 150 may be a legacy fixture (e.g., a lighting fixture that does not employ wireless functionality), controller 144 may be invoked by activation of element "1" to cause lighting fixture 150 to become illuminated (e.g., via appropriate 0-10V signaling provided by controller 144 to lighting fixture 150).

As per another example, a touch that may be detected by either of controllers 118, 120 and/or 122 in the vicinity of element "2" of panels 130, 132 and/or 134, respectively, may cause the lighting fixture(s) that correspond to element "2" (e.g., lighting fixture 152 of zone 2) to become activated. However, since lighting fixture 152 may be a legacy fixture (e.g., a lighting fixture that does not employ wireless functionality), controller 144 may be invoked by activation of element "2" to cause lighting fixture 152 to become illuminated (e.g., via appropriate DMX signaling provided by controller 144 to lighting fixture 152).

As per yet another example, a touch that may be detected by either of controllers 118, 120 and/or 122 in the vicinity of elements "3", "4" or "5" of panels 130, 132 and/or 134, respectively, may cause the lighting fixture(s) that correspond to elements "3", "4" or "5" (e.g., lighting fixtures 106, 108 or 110) to become activated. However, since lighting fixtures 106, 108 and 110 may be a next generation fixture (e.g., a lighting fixture that does employ wireless functionality), LED engine 114 may be directly invoked by activation of elements "3", "4" or "5" to cause LED engine 114 to become active. Depending upon the wireless signaling contained within each data packet directed to LED engine 114, either of lighting fixtures 106, 108 and/or 110 may become illuminated. In an alternate embodiment, LED engine 114 may not be a next generation device, in which case controller 144 may instead be invoked to supply the appropriate DMX signaling via control bus 148 to lighting fixtures 106, 108 and/or 110 in response to activation of elements "3", "4" or "5" of panels 130, 132 and/or 134, respectively.

Once a particular lighting fixture has been activated, each of controllers 118, 120 and/or 122 may be used to control an aspect of the light generated (e.g., an intensity of the light generated). For example, panels 124, 126 and 128 may similarly be touch sensitive (e.g., capacitively touch sensitive) and firmware executing on each of the respective processors (not shown) of each controller may construe the particular location of a sensed touch as an indication of intensity control. A sensed touch, for example, on one end of any of panels 124, 126 and/or 128 may indicate a minimum intensity, whereas a sensed touch on an opposite end of any of panels 124, 126 and/or 128 may indicate a maximum intensity. Sensed touches anywhere between the opposing ends of panels 124, 126 and 128 may indicate an intensity that is proportional to the location of the touch with respect to the location of either end of panels 124, 126 and 128. Whether the activated lighting fixture is a legacy fixture or a next generation fixture, controller 144 and/or LED engine 114 may be invoked by activation of the control signal (e.g., intensity control signal) to cause the activated lighting fixture to become illuminated according to the requested lighting aspect (e.g., intensity) via the appropriate signaling (e.g., 0-10V or DMX signaling) as may be required by the activated lighting fixture.

It should be noted, for example, that each of controllers 118, 120 and/or 122 may provide feedback as to the controlled functionality implemented by the lighting systems of network 100 irrespective of the source of the control. As per an example, controller 118 may assume control of network 100 and, therefore, may: 1) instruct the lighting systems of network 100 to become activated (e.g., through a touch detection at element 184 of panel 130); 2) activate a particular lighting fixture or zone of lighting fixtures (e.g., through a touch detection at any of elements "1" through "5" of panel 130); and activate a particular aspect of the emitted light (e.g., intensity of light through a touch detection along any portion of panel 124) of the activated lighting fixture. As a feedback mechanism provided to the person holding mobile controller 118, any one or more LEDs of LED array 170 may become illuminated to indicate, for example, whether: 1) the lighting systems of network 100 are activated; and 2) which lighting fixture or zone of lighting fixtures is activated. Similarly, any one or more LEDs of LED array 172 may become illuminated to indicate the particular lighting aspect (e.g., intensity) selected.

Through appropriate signaling within thread-based mesh network 116, the remaining controllers (e.g., controllers 120 and 122) may provide similar feedback as to the controlled functionality as dictated by controller 118. For example, any one or more of the LEDs of LED arrays 166 and 162 of controllers 120 and 122, respectively, may be illuminated identically as compared to the one or more LEDS of LED array 170 of controller 118 to indicate which lighting fixture or zone of lighting fixtures is activated. Similarly, any one or more of the LEDs of LED arrays 168 and 164 of controllers 120 and 122, respectively, may be illuminated identically as compared to the one or more LEDS of LED array 172 of controller 118 to indicate the lighting aspect (e.g., intensity) that is exhibited by the activated lighting fixture or zone of lighting fixtures.

It should be noted that any of controllers 118, 120 and 122 may assume master control of network 100 through appropriate signaling within thread-based mesh network 116 that are based upon the sensed touch events as may be detected by the processor (not shown) of any one of the controllers 118, 120 and 122. In response, the remaining controllers may provide appropriate feedback as to the state of network 100 as dictated by the master controller.

Network 100 may, for example, be sensitive to control signals as may be provided by controlling entities (e.g., external BACnet network 188) that may exist external to thread-based mesh network 116. As per an example, each entity within network 100 may be BACnet enabled, which may allow communication with BACnet router 178. In such an instance, control signals bound for network 100 may be transmitted by external BACnet network 188 via Internet 174 and propagated throughout network 100 via BACnet router 178. Conversely, status information related to network 100 may be gathered by BACnet router 178 and may then be disseminated to external BACnet network 188 via Internet 174.

In an alternate embodiment, device 176 may be a device (e.g., a smartphone or tablet) that may be Internet/Wi-Fi enabled. As such, device 176 may communicate with Wi-Fi 180 of border router 178 to: 1) provide control information to network 100; and/or 2) receive status information from network 100. Accordingly, once device 176 obtains the network configuration defined by network 100 (e.g., via Wi-Fi 180 of border router 178), device 176 may act as a mobile controller to network 100 in substantially the same way that controllers 118 and 120 act as mobile controllers to network 100 as discussed above. As such, device 176 may control the lighting aspects of network 100 and may receive feedback information from network 100 (e.g., the activated lighting fixture or zone of lighting fixtures and the related light intensity being generated by the activated lighting fixture(s)).

It should be noted that device 176 may communicate with multiple networks via the border routers of each of the multiple networks (not shown) that may be similar in functionality to network 100. As an example, sub-networks similar to network 100 may be replicated throughout a building, where each sub-network may represent the lighting system as implemented in each area of the building (e.g., office areas, break rooms, manufacturing areas, shipping/receiving areas and bathrooms). Accordingly, as device 176 roams in and out of each area of the building, it may interrogate the respective sub-network as defined in each area to control the lighting aspects of the sub-network and to receive feedback information from the sub-network.

Figure 2:
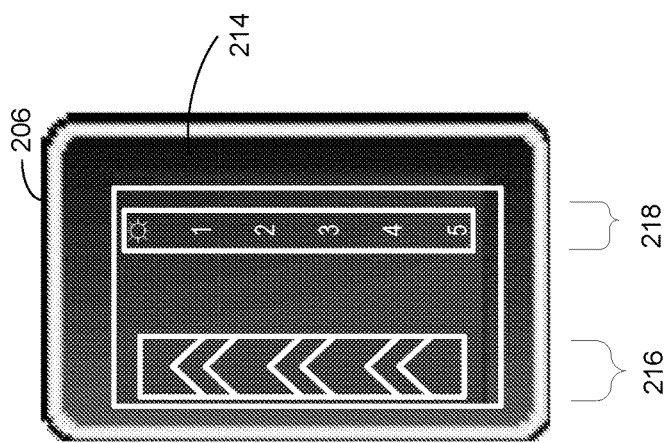
FIG. 2 illustrates a wireless controller configuration in accordance with one embodiment of the present invention.
Figure 2:
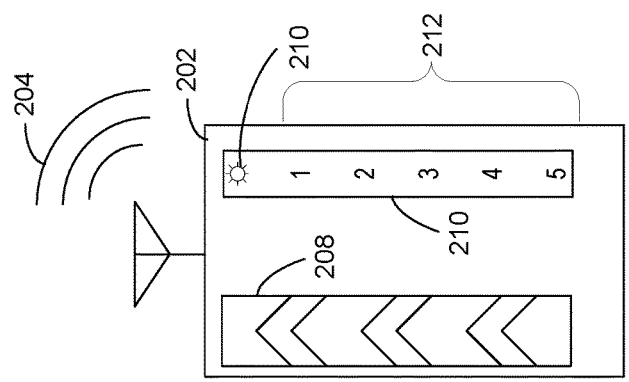

Turning to FIG. 2, a configuration transfer mechanism is exemplified, in which controller 202 (e.g., as exemplified by controller 118 or 120 of FIG. 1) may impart its configuration to device 206, which may be any one of a number of devices that may be wirelessly enabled (e.g., Bluetooth enabled), such as a smartphone, an electronic tablet, a watch or laptop to name only a few. As depicted, controller 202 may wirelessly communicate (e.g., communicate via Bluetooth channel 204) with device 206 to impart information indicative of the operational capabilities of controller 202.

As an example, controller 202 may exhibit slider-like functionality as may be defined by panel 208 and button-like functionality as may be defined by panel 210. In addition, panels 208 and 210 may be part of an overlay that is placed onto a printed circuit board (PCB) of controller 202 that may be configured for touch detection (e.g., capacitive touch detection). As such, the overlay may visually depict functionality that may occur when the processor (not shown) of controller 202 detects a touch anywhere within the areas defined by panels 208 and 210.

In other words, while the PCB portion of controller 202 may be configured to be generically touch sensitive, panels 208 and 210 may visually depict how the processor (not shown) of controller 202 reacts to touch events that are sensed within panels 208 and 210. For example, while a touch may be sensed on panel 208, no action may necessarily be taken by the processor until the processor detects a subsequent and continuous touch event occurring on panel 208. If the subsequent touch event on panel 208 occurs above the previous touch event and is continuous from the previous touch event, for example, then the processor may determine that an increasing function has been signaled on panel 208 and may take appropriate action (e.g., the processor may issue a thread-based command to increase the intensity of an activated light fixture). Conversely, for example, if the subsequent touch event on panel 208 occurs below the previous touch event and is continuous from the previous touch event then the processor may determine that a decreasing function has been signaled on panel 208 and may take appropriate action (e.g., the processor may issue a thread-based command to decrease the intensity of an activated light fixture).

Alternatively, panel 210 may visually depict operations that require only a single touch event. For example, a single touch event detected at element 210 may prompt the processor (not shown) of controller 202 to take appropriate action (e.g., the processor may issue a thread-based command to activate lighting fixtures within the lighting network). As another example, a single touch event detected in the vicinity of elements 212 may prompt the processor to take appropriate action (e.g., the processor may issue a thread-based command to activate the lighting fixture or zone of lighting fixtures most closely corresponding to the area within panel 210 that was touched).

Once the configuration transfer from controller 202 to device 206 is complete, device 206 may adopt the functionality of controller 202 and, therefore, behave as controller 202 (e.g., provide the functionality of controllers 118 or 120 as discussed in relation to FIG. 1). In one embodiment, for example, device 206 may be a Wi-Fi enabled device (e.g., device 176 of FIG. 1) and may detect a touch anywhere within display 214. If a processor (not shown) of device 206 detects a touch anywhere within area 216 of display 214, then the processor may take appropriate action (e.g., issue a Wi-Fi command to Wi-Fi 180 of border router 178 to adjust the intensity of any light activated within network 100 of FIG. 1). The Wi-Fi command may then be processed accordingly (e.g., border router 178 may issue a thread-based command to the thread-based mesh network 116 to control the intensity of the activated light fixture of network 100 of FIG. 1).

Conversely, for example, if a processor (not shown) of device 206 detects a touch anywhere within area 218 of display 214, then the processor may take appropriate action (e.g., issue a Wi-Fi command to Wi-Fi 180 of border router 178 to activate any light within network 100 of FIG. 1). The Wi-Fi command may then be processed accordingly (e.g., border router 178 may issue a thread-based command to the thread-based mesh network 116 to activate the selected light fixture of network 100 of FIG. 1).

In alternate embodiments, device 206 may itself be thread enabled. As such, device 206 may communicate directly with a thread-based network (e.g., thread-based mesh network 116 of FIG. 1) to directly control a lighting network (e.g., network 100 of FIG. 1).

Figure 3:
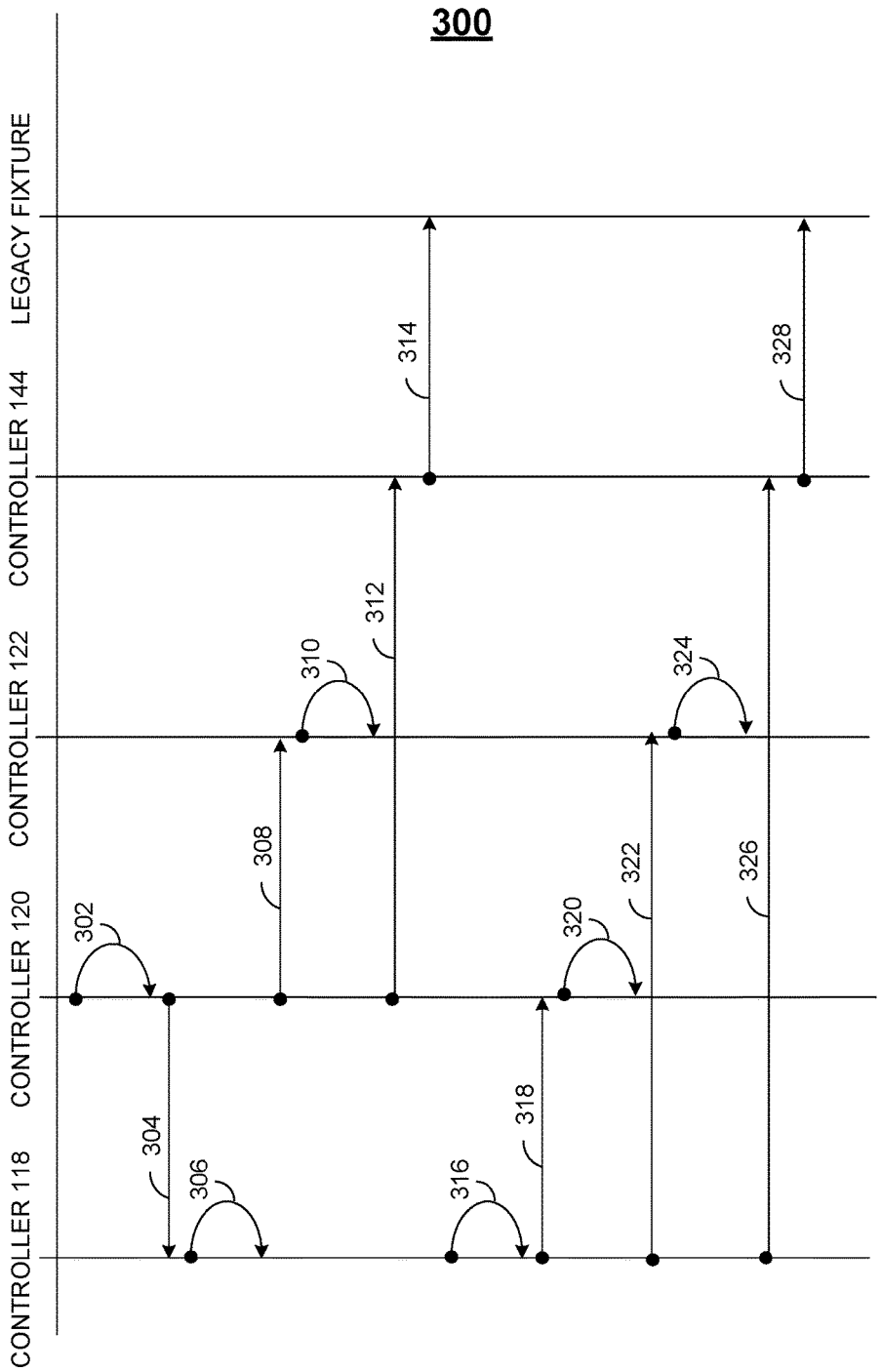
FIG. 3 illustrates a message diagram in accordance with one embodiment of the present invention.

Turning to FIG. 3, messaging diagram 300 is exemplified, which may depict a scenario whereby a controller (e.g., controller 120 of FIG. 1) initiates a wireless command (e.g., a wireless command on thread-based mesh network 116) to activate a light fixture (e.g., legacy light fixture 150 of FIG. 1). The command sequence continues whereby a controller (e.g., controller 118) initiates a wireless command (e.g., a wireless command on thread-based mesh network 116) to control a lighting aspect (e.g., intensity) of the activated legacy light fixture.

In message 302, for example, a processor resident within controller 120 may detect a touch within panel 132 that may be most proximate to element "1" of panel 132. The processor may then determine that lighting fixture 150 is commanded by the user of controller 120 to become illuminated and may then cause the LED proximate to element "1" of panel 132 to become illuminated, thereby indicating that the light fixture associated with element "1" is activated within network 100.

In message 304, the touch detected by controller 120 may be communicated to controller 118 via thread-based mesh network 116. In message 306, a processor resident within controller 118 may determine that lighting fixture 150 is commanded by the user of controller 120 to become illuminated and may then cause the LED proximate to element "1" of panel 130 to become illuminated, thereby indicating that the light fixture associated with element "1" is activated within network 100.

In message 308, the touch detected by controller 120 may be communicated to controller 122 via thread-based mesh network 116. In message 310, a processor resident within controller 122 may determine that lighting fixture 150 is commanded by the user of controller 120 to become illuminated and may then cause the LED proximate to element "1" of panel 134 to become illuminated, thereby indicating that the light fixture associated with element "1" is activated within network 100. Accordingly, all controllers within network 100 may be updated and may correctly display feedback associated with the active lighting fixture within network 100.

In message 312, controller 144 may be commanded to illuminate lighting fixture 150. In message 314, controller 144 may apply power to light fixture 150 and may command light fixture 150 to a pre-selected intensity.

In message 316, a processor resident within controller 118 may detect a touch within panel 124 that may be indicative of a lighting intensity command. The processor may then determine that since lighting fixture 150 is commanded by the user of controller 118 to a particular intensity, it may then cause one or more LEDs of LED array 172 to become illuminated, thereby indicating the intensity of the light fixture associated with element "1" within network 100.

In message 318, the touch detected by controller 118 may be communicated to controller 120 via thread-based mesh network 116. In message 320, a processor resident within controller 120 may determine that an intensity of lighting fixture 150 is commanded by the user of controller 118 and may then cause one or more LEDs of LED array 168 to become illuminated, thereby indicating the intensity of the light fixture associated with element "1" within network 100.

In message 322, the touch detected by controller 118 may be communicated to controller 122 via thread-based mesh network 116. In message 324, a processor resident within controller 122 may determine that an intensity of lighting fixture 150 is commanded by the user of controller 118 and may then cause one or more LEDs of LED array 164 to become illuminated, thereby indicating the intensity of the light fixture associated with element "1" within network 100. Accordingly, all controllers within network 100 may be updated and may correctly display feedback associated with the intensity of lighting fixture 150 within network 100.

In message 326, controller 144 may be commanded to illuminate lighting fixture 150 with the commanded intensity. In message 328, controller 144 may command light fixture 150 to the commanded intensity via 0-10V signaling.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A lighting network, comprising:
   one or more light fixtures;
   a first controller coupled to the one or more light fixtures and configured to provide wired control of one or more aspects of light generated by the one or more light fixtures in response to first and second wireless commands;
   a second controller wirelessly coupled to the first controller and configured to provide the first wireless command; and
   a third controller wirelessly coupled to the first controller and configured to provide the second wireless command, wherein the second controller is configured to provide a visual indication of the response to the second wireless command provided by the third controller and the third controller is configured to provide a visual indication of the response to the first wireless command provided by the second controller.

2. The lighting network of claim 1, wherein the second controller transmits the first wireless command to the third controller via a thread-enabled mesh network.

3. The lighting network of claim 1, wherein the third controller wirelessly transmits the second wireless command to the second controller via a thread-enabled mesh network.

4. The lighting network of claim 1, further comprising at least one sensor coupled to the first controller and configured to provide wired status to the first controller.

5. The lighting network of claim 4, wherein the wired status includes 0-10 v wired status.

6. The lighting network of claim 4, wherein the wired status includes occupancy detection.

7. The lighting network of claim 4, wherein the wired status includes ambient light detection.

8. The lighting network of claim 4, further comprising an access point wirelessly coupled to the first controller, the access point configured to receive Internet-based commands from networks external to the lighting network and to provide the Internet-based commands to the first controller.

9. The lighting network of claim 8, wherein the access point is configured to exchange Wi-Fi information.

10. The lighting network of claim 9, wherein the first, second and third controllers are configured to exchange Wi-Fi information with the access point, the exchanged information including the first and second wireless commands.

11. The lighting network of claim 10, wherein the exchanged information includes the wired status.

12. A lighting system, comprising:
    a first controller configured to provide a wired control signal and a wireless control signal;
    a first light fixture configured to activate a first lighting aspect in response to the wired control signal;
    a second light fixture configured to activate a second lighting aspect in response to the wireless control signal;

second and third controllers wirelessly coupled to the first controller and configured to transmit first and second control signals, respectively, wherein the first controller is configured to provide the wired control signal in response to the first control signal and further configured to provide the wireless control signal in response to the second control signal; and wherein the second controller is configured to provide a visual indication of the response to the second control signal transmitted by the third controller and the third controller is configured to provide a visual indication of the response to the first control signal transmitted by the second controller.

13. The lighting system of claim 12, wherein the responses to the first and second control signals includes light intensity.

14. The lighting system of claim 12, wherein the responses to the first and second control signals includes light activation.

15. The lighting system of claim 12, wherein the second and third controllers transmit the first and second control signals in response to commands received from the Internet.

16. A method of controlling a lighting system, comprising:
  configuring a first controller to provide first and second wired control signals in response to receiving first and second wireless signals, respectively;
  activating a first lighting aspect in response to the first wired control signal;
  activating a second lighting aspect in response to the second wired control signal;
  configuring second and third controllers to transmit the first and second wireless control signals, respectively, wherein the first controller provides a visual indication of the second lighting aspect activated by the second controller and the second controller provides a visual indication of the first lighting aspect activated by the first controller.

17. The lighting system of claim 16, wherein the first and second lighting aspects includes light intensity.

18. The lighting system of claim 16, wherein the first and second lighting aspects includes light activation.

* * * * *